(12) United States Patent
Kimura et al.

(10) Patent No.: US 9,176,366 B2
(45) Date of Patent: Nov. 3, 2015

(54) METHOD FOR CONTROLLING A PROJECTOR INCLUDING A COOLING UNIT INSULATED FROM A POWER-SUPPLY UNIT

(71) Applicant: SEIKO EPSON CORPORATION, Tokyo (JP)

(72) Inventors: Keishi Kimura, Matsumoto (JP); Kenichi Shioiri, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 418 days.

(21) Appl. No.: 13/667,508

(22) Filed: Nov. 2, 2012

(65) Prior Publication Data

US 2013/0128235 A1 May 23, 2013

(30) Foreign Application Priority Data

Nov. 18, 2011 (JP) ................................. 2011-252697

(51) Int. Cl.
  *G03B 21/16* (2006.01)
  *G03B 21/00* (2006.01)
  *H04N 9/31* (2006.01)
(52) U.S. Cl.
  CPC .............. *G03B 21/16* (2013.01); *G03B 21/006* (2013.01); *H04N 9/3144* (2013.01)
(58) Field of Classification Search
  CPC .............................. G03B 21/16; H04N 9/3144

USPC ........... 353/52, 53, 54, 55, 56, 57, 58, 59, 60, 353/61
See application file for complete search history.

(56) References Cited

U.S. PATENT DOCUMENTS

| 2003/0020884 | A1* | 1/2003 | Okada et al. ..................... 353/57 |
| 2004/0100749 | A1* | 5/2004 | Lentz et al. .................. 361/93.8 |
| 2009/0289557 | A1* | 11/2009 | Itoh et al. ....................... 315/127 |
| 2012/0026470 | A1* | 2/2012 | Katou .............................. 353/57 |

FOREIGN PATENT DOCUMENTS

| JP | 2006-145824 A | 6/2006 |
| JP | 2006145824 A | * 6/2006 |
| JP | 2008-242018 A | 10/2008 |

* cited by examiner

*Primary Examiner* — Bao-Luan Le
(74) *Attorney, Agent, or Firm* — Maschoff Brennan

(57) ABSTRACT

A projector according to an embodiment of the invention can measure the temperature of an object to be cooled accurately with a simple configuration and perform accurate cooling control. The projector includes a power-supply unit, a ballast unit having a ballast control circuit and a photocoupler, and a control unit. The power-supply unit includes a temperature detection element generating temperature information indicating the temperature inside the power-supply unit. The ballast control circuit controls a constant-current control circuit and the like based on the control information transmitted from the control unit via the photocoupler and transmits temperature data based on the temperature information to the control unit via the photocoupler. The control unit includes a projector control circuit performing cooling control on the power-supply unit based on the temperature data.

5 Claims, 3 Drawing Sheets

METHOD FOR CONTROLLING A PROJECTOR INCLUDING A COOLING UNIT INSULATED FROM A POWER-SUPPLY UNIT

BACKGROUND

1. Technical Field

The present invention relates to projectors and cooling control methods.

2. Related Art

In a projector, it is necessary to perform appropriate cooling control depending on an environment in which the projector is used while suppressing noise produced by a cooling fan. For example, in JP-A-2006-145824, a method for driving an air-cooling fan by connecting a temperature detection circuit provided outside a main power supply section in a primary device and a fan drive circuit in a secondary device with a dedicated path provided between the temperature detection circuit and the fan drive circuit in a projector is proposed. Moreover, in JP-A-2008-242018, a method for controlling the rotational speed of a cooling fan by detecting the temperature inside a primary device by transmitting and receiving infrared radiation with a dedicated communication path by using an infrared emitting section provided in the primary device and an infrared receiving section provided in a secondary device is proposed. As described above, the reason why a new path, not an existing path, is provided is that a power-supply unit in the primary device and a power supply route that is insulated from the secondary device are used, which makes it difficult to transmit temperature information to the secondary device by using the power supply route.

However, in these methods, it is necessary to provide a new path and the like for connecting the primary device and the secondary device. This complicates the configuration and increases production costs. Moreover, since the inside of the housing of the projector is used as a path of wind produced by an air intake fan and an exhaust fan, when a new wired path or a new member is added, part of the path of wind is blocked, which may reduce cooling efficiency. Thus, it is preferable that addition of new members be kept to a minimum. Furthermore, since various noise sources are present in the projector, there is a possibility that the temperature data is not transmitted accurately over a wireless path using infrared radiation or the like due to noise.

SUMMARY

An advantage of some aspects of the invention is to provide a projector and a cooling control method that can perform accurate cooling control by measuring, with a simple configuration, the temperature of an object to be cooled.

An aspect of the invention is directed to a projector including: a power-supply unit; a first control unit having a first control section and an insulation transmitting section; and a second control unit, wherein the power-supply unit includes a temperature information generating section generating temperature information indicating the temperature inside the power-supply unit, the first control section performs control that is different from cooling control based on control information transmitted from the second control unit via the insulation transmitting section and transmits temperature data based on the temperature information to the control unit via the insulation transmitting section, and the second control unit includes a second control section generating the control information and performing cooling control on at least the power-supply unit based on the temperature data.

Another aspect of the invention is directed to a cooling control method for controlling cooling of the inside of a projector, the cooling control method including: transmitting, by a second control section, control information to a first control section via an insulation transmitting section; performing, by the first control section, control different from cooling control based on the control information; generating, by at least one temperature detecting section provided near at least one power source-related circuit, temperature information indicating the temperature of the power source-related circuit; transmitting, by the first control section, temperature data based on the temperature information to the second control section via the insulation transmitting section; and performing, by the second control section, cooling control on at least the power source-related circuit based on the temperature data.

According to the aspects of the invention, since the projector can generate temperature information indicating the temperature inside the power-supply unit and transmit temperature data based on the temperature information to the second control unit via the insulation transmitting section that can be used for a purpose other than cooling control, it is necessary simply to add only a small number of new elements. This makes it possible to measure the temperature of an object to be cooled accurately with a simple configuration and perform accurate cooling control.

Moreover, the power-supply unit may include at least one power source-related circuit, and the temperature information generating section may include at least one temperature detecting section provided near the power source-related circuit and generating temperature information indicating the temperature of the power source-related circuit. This allows the projector to measure the temperature of the object to be cooled more accurately by using the temperature detecting section located near the power source-related circuit.

Furthermore, the temperature information may be analog information, the first control unit may include a digital converting section performing digital conversion on the temperature information, and the first control section may transmit the temperature information on which digital conversion has been performed by the digital converting section to the second control unit as the temperature data. This allows the projector to use a more simplified temperature detecting section and makes it possible to simplify also the power-supply unit and measure the temperature of the object to be cooled accurately at low cost.

In addition, the power-supply unit, the first control unit, and the second control unit may be provided on different substrates. This allows the projector to use substrates in accordance with the uses thereof and makes it possible to measure the temperature of the object to be cooled accurately in a more versatile manner.

Moreover, the first control unit may be a ballast unit connected to a high-pressure discharge lamp, and the first control section may control the turning on of the high-pressure discharge lamp. As a result, even when the projector projects a bright image by using the high-pressure discharge lamp, the projector can measure the temperature of the object to be cooled accurately while reducing the size of the power-supply unit or the like and production costs.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention which is applied to a projector will be described with reference to the drawings. It should be understood that the embodiments described below are not meant to limit the scope of the invention claimed in the appended claims in any way, and all the configurations described in the embodiments are not always necessary for means for solving the problems of the invention claimed in the appended claims.

First Embodiment

Figure 1:
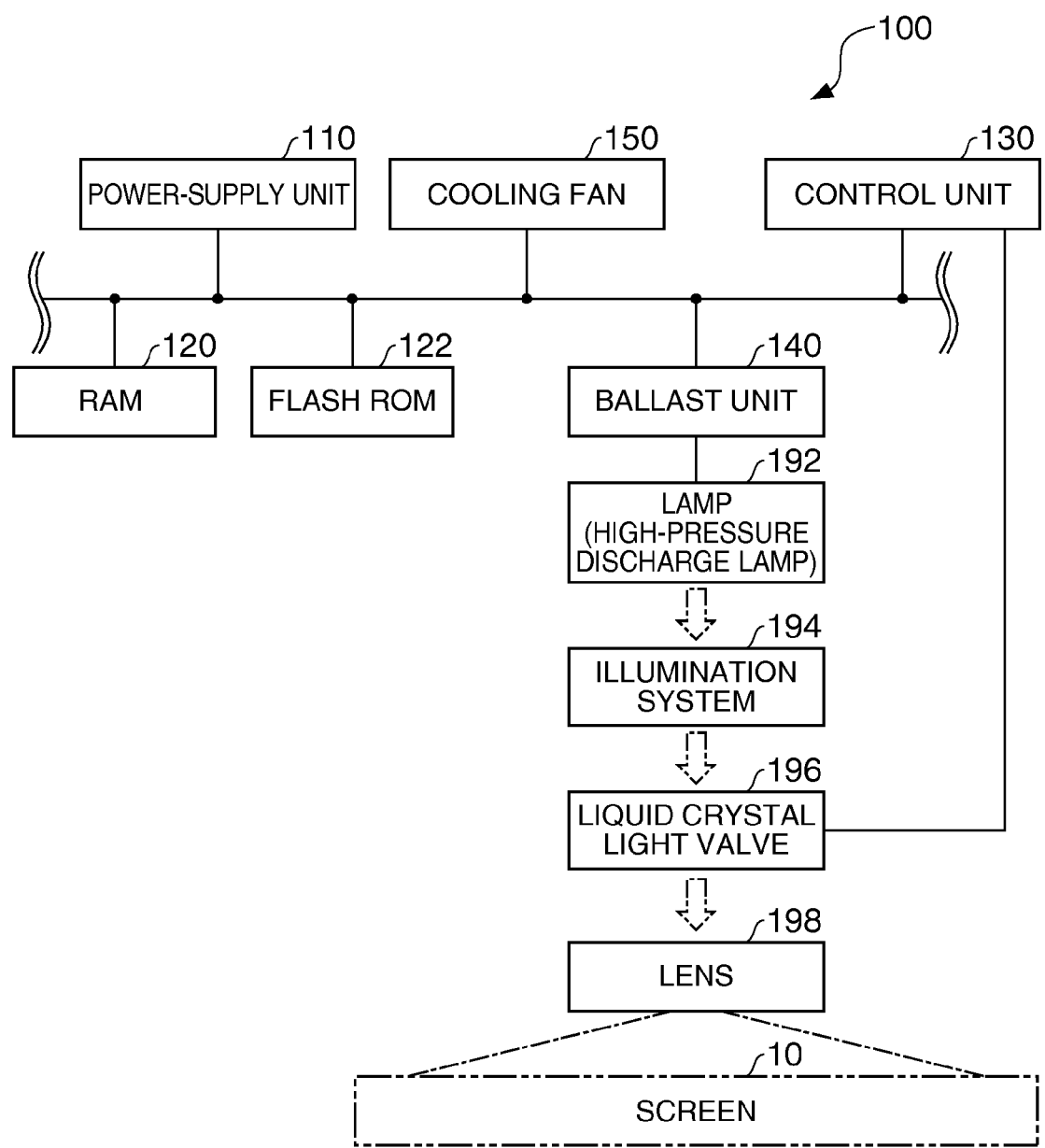
FIG. 1 is a hardware block diagram of a projector in a first embodiment.

FIG. 1 is a functional block diagram of a projector 100 in a first embodiment. The projector 100 includes a power-supply unit 110 that is supplied with power from a household power supply and supplies power to individual sections in the projector 100, RAM 120 storing image data etc., flash ROM 122 storing setting data etc., a cooling fan 150, a control unit (a second control unit) 130 controlling the cooling fan 150 etc., a lamp 192 which is a high-pressure discharge lamp or the like, a ballast unit (a first control unit) 140 controlling the driving of the lamp 192, an illumination system 194, a liquid crystal light valve 196, and a lens 198. The light emitted from the lamp 192 is projected onto a screen 10 after passing through the illumination system 194, the liquid crystal light valve 196, and the lens 198. As a result, an image is displayed on the screen 10.

Figure 2:
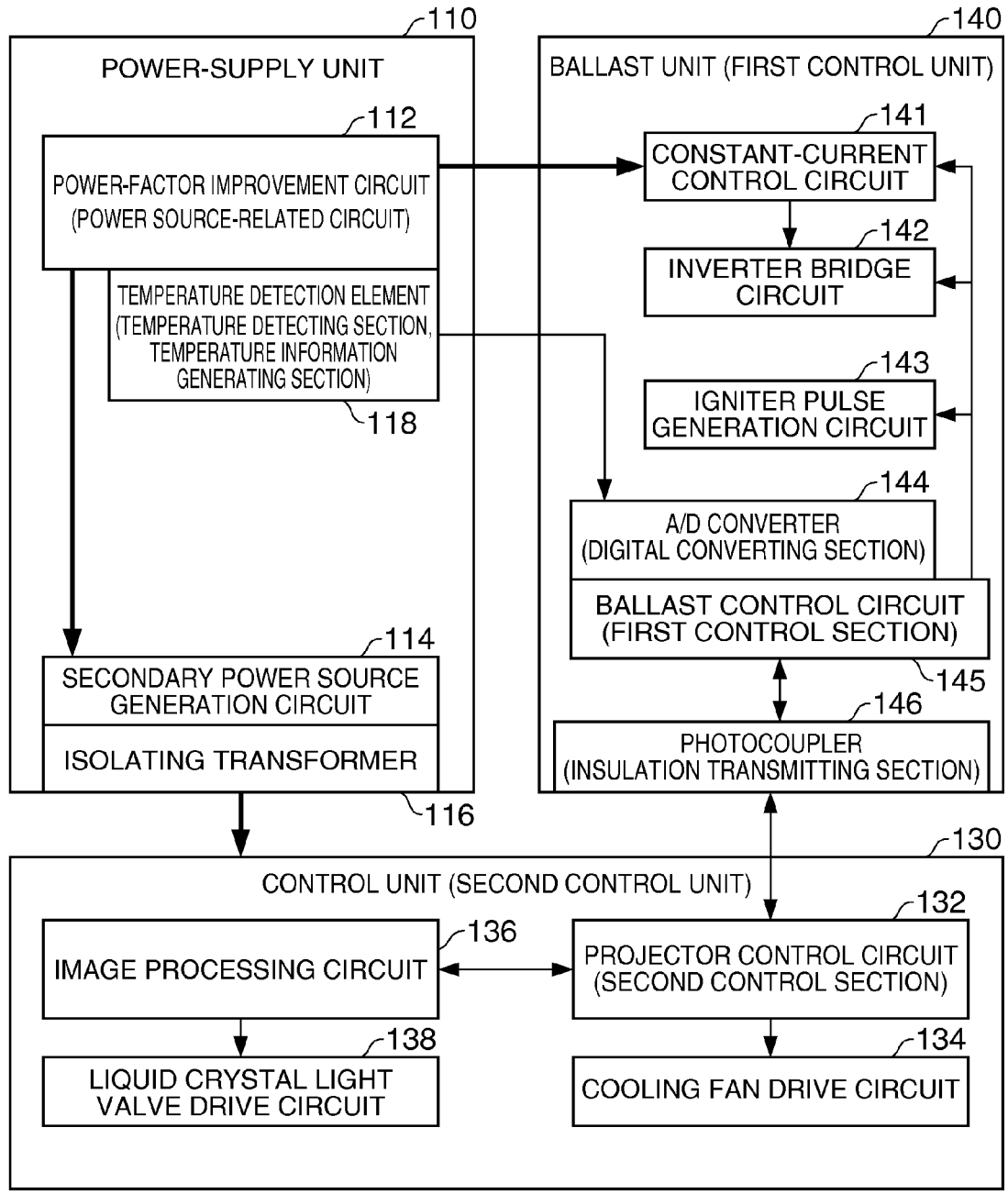
FIG. 2 is a power source-related circuit block diagram of the projector in the first embodiment.

Next, a power source-related circuit block of the projector 100 will be described. FIG. 2 is a power source-related circuit block diagram of the projector 100 in the first embodiment. The power-supply unit 110 includes a power-factor improvement circuit 112 which is a power source-related circuit, a secondary power source generation circuit 114, an isolating transformer 116 supplying a secondary power source to the control unit 130 under insulated conditions, and a temperature detection element 118 detecting the temperature of the power-factor improvement circuit 112. The temperature detection element 118 is, for example, a thermistor or the like, functions as a temperature information generating section generating analog temperature information, and is provided near the power-factor improvement circuit 112.

The ballast unit 140 includes a constant-current control circuit 141 to which power is supplied from the power-factor improvement circuit 112, an inverter bridge circuit 142 generating a drive current for driving the lamp 192 by receiving a direct current from the constant-current control circuit 141 and reversing the polarity of the direct current with given timing, an igniter pulse generation circuit 143 generating an igniter pulse for turning on the lamp 192, an A/D converter (a digital converting section) 144 converting an analog signal (temperature information) from the temperature detection element 118 into a digital signal, a photocoupler 146 which is an insulation transmitting section for transmitting and receiving information to and from the control unit 130 under insulated conditions, and a ballast control circuit (a first control section) 145 performing, based on the control information transmitted from the control unit 130 via the photocoupler 146, turning on/off of the lamp 192, drive power adjustment, etc. by controlling the constant-current control circuit 141, the inverter bridge circuit 142, and the igniter pulse generation circuit 143, etc.

The control unit 130 includes an image processing circuit 136 generating an image, a liquid crystal light valve drive circuit 138 driving the liquid crystal light valve 196 in which the generated image is formed, a projector control circuit (a second control section) 132 generating control information for the ballast control circuit 145 and performing cooling control, and a cooling fan drive circuit 134 driving the cooling fan 150.

Incidentally, as shown in FIG. 2, the power-supply unit 110 and the ballast unit 140 which are primary devices and the control unit 130 which is a secondary device are kept under insulated conditions by the isolating transformer 116 and the photocoupler 146. Moreover, the power-supply unit 110, the ballast unit 140, and the control unit 130 are mounted on different substrates.

Figure 3:
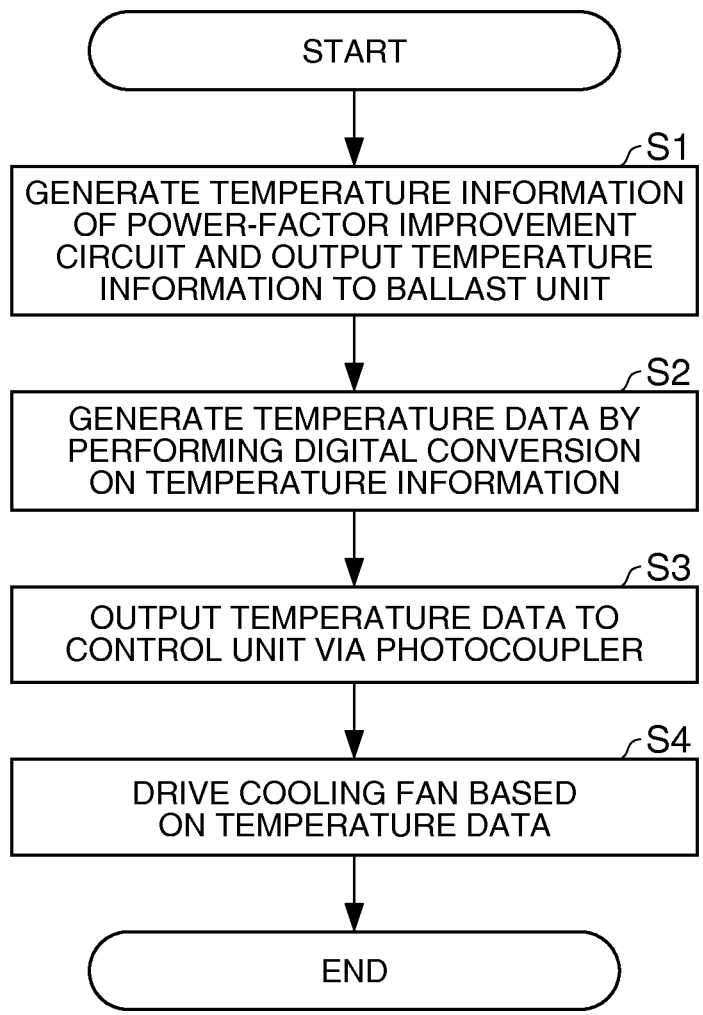
FIG. 3 is a flowchart showing a cooling control procedure of the projector in the first embodiment.

Next, a cooling control procedure using these sections will be described. FIG. 3 is a flowchart showing the cooling control procedure of the projector 100 in the first embodiment. The temperature detection element 118 generates temperature information by detecting the temperature of the power-factor improvement circuit 112 and outputs the temperature information to the ballast unit 140 (step S1). Incidentally, the temperature information is, for example, a resistance value or a voltage value that can be converted into a temperature and an analog signal, a digital signal, etc. indicating a temperature. In this embodiment, the temperature information is an analog signal.

The A/D converter 144 performs digital conversion on the analog temperature information from the temperature detection element 118, and the ballast control circuit 145 generates temperature data based on the temperature information on which digital conversion has been performed (step S2). Incidentally, the temperature data is, for example, digital data etc. indicating a temperature.

The ballast control circuit 145 outputs the temperature data to the control unit 130 via the photocoupler 146 (step S3). The projector control circuit 132 controls the cooling fan drive circuit 134 based on the temperature data, and the cooling fan drive circuit 134 drives the cooling fan 150 in accordance with the control (step S4). More specifically, when the temperature is higher than a reference range, the projector control circuit 132 may drive the cooling fan 150 by making the rotational speed of the cooling fan 150 higher than a reference speed; when the temperature is lower than the reference range, the projector control circuit 132 may drive the cooling fan 150 by making the rotational speed of the cooling fan 150 lower than the reference speed; when the temperature is in the reference range, the projector control circuit 132 may drive the cooling fan 150 by using the rotational speed of the cooling fan 150 as a reference speed.

As described above, according to this embodiment, since the projector 100 can generate temperature information indicating the temperature inside the power-supply unit 110 by using the temperature detection element 118 located near the power-factor improvement circuit 112 and transmit the temperature data based on the temperature information to the control unit 130 via the photocoupler 146, the projector 100 can measure the temperature of an object to be cooled more accurately while keeping insulated conditions and perform more accurate cooling control. Moreover, according to this embodiment, since the projector 100 can measure the temperature with a simple configuration because, by using an existing path between the photocoupler 146 and the control unit 130, it is necessary simply to add only a small number of new elements, it is possible to reduce the production costs of the projector 100 and little influence is allowed to be exerted on the existing configuration. Furthermore, as compared to a case in which a wireless path is used, the projector 100 is insusceptible to noise, making it possible to transmit the temperature data more accurately.

Moreover, according to this embodiment, since the projector 100 projects a bright image by using a high-pressure discharge lamp, the projector 100 can transmit the temperature inside the power-supply unit 110 to the control unit 130 via the ballast unit 140 in a state in which the power-supply unit 110, the ballast unit 140, and the control unit 130 are separated from one another and are mounted on different substrates. As a result, the projector 100 can transmit an accurate temperature to the control unit in a state in which the configuration of the power-supply unit 110 is simplified to reduce the mounting size and the production costs are reduced.

Furthermore, by using, as the temperature detection element 118, a simple element performing analog output, the projector 100 can use a more simplified temperature detecting section, which makes it also possible to simplify the power-supply unit 110. This makes it possible to measure the temperature of the object to be cooled accurately at low cost.

Other Embodiments

Incidentally, application of the present invention is not limited to the embodiment described above and modification thereof is possible. For example, the power-supply unit 110, the ballast unit 140, and the control unit 130 may be mounted on one substrate, or the power-supply unit 110 and the ballast unit 140 may be mounted on one substrate and the control unit 130 may be mounted on another substrate. Incidentally, as a result of the power-supply unit 110 and other elements being mounted on different substrates as in the embodiment described above, the projector 100 can use substrates in accordance with the uses thereof, which makes it possible to measure the temperature of the object to be cooled accurately in a more versatile manner.

Moreover, the temperature information generating section is not limited to the temperature detection element 118 and may be a temperature sensor etc. performing digital output. Furthermore, the power source-related circuit whose temperature is to be measured is not limited to the power-factor improvement circuit 112 and may be the secondary power source generation circuit 114 or the like. In addition, a plurality of temperature information generating sections may be provided and measure the temperatures of different power source-related circuits, and the projector control circuit 132 may perform cooling control based on the plurality of pieces of temperature data.

More specifically, for example, the projector control circuit 132 may perform cooling control in such a way as to cool the power source-related circuit with the highest temperature preferentially. Moreover, there may be one or more than one line connecting the plurality of temperature information generating sections and the control section. For example, when there is one line, the developer or the like may switch the temperature information generating section which is an output source of the temperature information with a jumper or the like. Moreover, the object to be cooled by the cooling fan 150 is not limited to the power-supply unit 110. For example, the whole of the projector 100 including the control unit 130 and the ballast unit 140 may be cooled.

Furthermore, the first control unit is not limited to the ballast unit, and a unit performing control (for example, image display control or sound output control) that is different from the control performed by the control unit 130 performing the cooling control can be used as the first control unit. Moreover, the second control unit is also not limited to the control unit 130 controlling the whole of the projector 100 and may be a unit performing only the cooling control, for example.

Furthermore, the projector 100 is not limited to a liquid crystal projector (a transmissive liquid crystal projector and a reflective liquid crystal projector such as LCOS) and may be, for example, a projector using a digital micromirror device. Moreover, the projector 100 may adopt, in place of the lamp 192, an organic EL device, a silicon light-emitting device, and a self light-emitting device including a solid light source such as a laser diode or an LED. In addition, the function of the projector 100 may be distributed among a plurality of devices (for example, a PC and a projector).

The entire disclosure of Japanese Patent Application No. 2011-252697, filed Nov. 18, 2011 is expressly incorporated by reference herein.

What is claimed is:

1. A projector comprising:
   a power-supply unit;
   a ballast unit connected to and configured to control a discharge lamp, the ballast unit having an insulation transmitting section;
   a cooling unit configured to cool the power-supply unit; and
   a control unit insulated from the power-supply unit and the ballast unit and configured to control the ballast unit and the cooling unit,
   wherein
   the power-supply unit includes a temperature information generating section configured to generate temperature information indicating the temperature inside the power-supply unit and output the temperature information to the ballast unit,
   the ballast unit transmits temperature data based on the temperature information outputted from the temperature information generating section to the control unit via the insulation transmitting section, and
   the control unit controls the cooling unit to cool the power-supply unit based on the temperature data from the ballast unit.

2. The projector according to claim 1, wherein
   the power-supply unit includes a power source-related circuit, and
   the temperature information generating section includes a temperature detecting section provided adjacent to the power source-related circuit and configured to generate the temperature information indicating the temperature of the power source-related circuit.

3. The projector according to claim 1, wherein
   the temperature information is analog information,
   the ballast unit includes a digital converting section configured to convert on the temperature information into digital data as the temperature data, and
   the ballast unit transmits the temperature data converted by the digital converting section to the control unit.

4. The projector according to claim 1, wherein
   the power-supply unit, the ballast unit, and the control unit are provided on different substrates.

5. A method for controlling a projector including a power-supply unit, a ballast unit connected to and configured to control a discharge lamp and having an insulation transmitting section, a cooling unit configured to cool the power-supply unit, and a control unit insulated from the power-supply unit and the ballast unit, the control unit configured to control the ballast unit and the cooling unit, comprising:
   generating temperature information indicating the temperature inside the power-supply unit;
   outputting the temperature information from the power-supply unit to the ballast unit;
   transmitting temperature data based on the temperature information outputted from the ballast unit to the control unit via the insulation transmitting section; and
   controlling the cooling unit to cool the power-supply unit based on the temperature data from the ballast unit.

\* \* \* \* \*